(12) United States Patent
Sugiyama

(10) Patent No.: US 6,392,706 B1
(45) Date of Patent: May 21, 2002

(54) APPARATUS AND METHOD OF MOVING PICTURE FORMAT CONVERSION

(75) Inventor: Kenji Sugiyama, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/409,656

(22) Filed: Sep. 30, 1999

(30) Foreign Application Priority Data

Sep. 30, 1998 (JP) .......................................... 10-277322

(51) Int. Cl.[7] ................................................ H04N 7/01
(52) U.S. Cl. ........................ 348/458; 348/448; 348/446
(58) Field of Search ................................ 348/448, 446, 348/452, 441, 722, 458

(56) References Cited

U.S. PATENT DOCUMENTS

| | | | | |
|---|---|---|---|---|
| 5,327,235 A | * | 7/1994 | Richards | 348/441 |
| 5,485,280 A | * | 1/1996 | Fuginami et al. | 358/335 |
| 5,517,247 A | * | 5/1996 | Correa et al. | 348/448 |
| 5,610,661 A | * | 3/1997 | Bhatt | 348/446 |
| 5,619,273 A | | 4/1997 | Sugiyama | 348/452 |

* cited by examiner

Primary Examiner—Victor R. Kostak
(74) Attorney, Agent, or Firm—Jacobson Holman, PLLC

(57) ABSTRACT

A first interlaced video signal of a first number of scanning lines is converted into a second interlaced video signal of a second number of scanning lines. The first and second numbers are different from each other. The first interlaced video signal is converted into a first progressive video signal of the first number of scanning lines by interpolating the first interlaced video signal with scanning lines which have been decimated from the first interlaced video signal. The first number of scanning lines of the first progressive video signal is converted into the second number of scanning lines by re-sampling, to generate a second progressive video signal of the second number of scanning lines. The second progressive video signal is then converted into the second interlaced video signal by decimating the second number of scanning lines of the second progressive video signal. Instead of generation of the second progressive signal, one of an even and odd frame of the first progressive video signal may be converted into an even field of the second interlaced video signal and the other of the even and odd frames of the first progressive video signal may be converted into an odd field of the second interlaced video signal. The even and odd fields are combined to compose the second interlaced video signal.

6 Claims, 4 Drawing Sheets

480i SPECTRAM

480p SPECTRAM

APPARATUS AND METHOD OF MOVING PICTURE FORMAT CONVERSION

BACKGROUND OF THE INVENTION

The present invention relates to conversion of moving picture format for video signal transfer, storage and displaying. Particularly, this invention relates to conversion of interlaced video signals to other interlaced video signals with different scanning lines.

Digital moving picture video signals are classified into video formats as shown in TABLE 1 with difference in scanning type (SP), the number of effective scanning lines (ESL), frame/field picture rate (PR), the number of pixels in the horizontal direction (PH) and picture aspect ratio (PAR).

TABLE 1

| TYPE | SP | ESL | PR (Hz) | PH | PAR |
| --- | --- | --- | --- | --- | --- |
| 480i | interlaced | 480 | 60 | 720 | 4:3 |
| 480p | progressive | 480 | 24/30/60 | 720 | 16:9 |
| 720p | progressive | 720 | 24/30/60 | 1280 | 16:9 |
| 1080i | interlaced | 1080 | 60 | 1920 | 16:9 |
| 1080p | progressive | 1080 | 24/30/60 | 1920 | 16:9 |

As shown in TABLE 1, the video formats define two scanning types, interlaced (i) and progressive (p) scanning; the number of scanning lines (in one frame for interlaced scanning), 480 for NTSC, and 720 or 1080 for HDTV; and picture rate, 60 Hz (accurately, 59.64 Hz) for interlaced scanning, and 24 or 30 Hz (like films) for progressive scanning.

The video formats as described above are converted to each other with conversion of, such as, picture rate, scanning type, and the number of scanning lines and pixels in the horizontal direction.

Conversion of interlaced video signals to other interlaced video signals with the same picture rate require conversion of only the number of scanning lines and pixels in the horizontal direction. The number of scanning lines is converted to another per filed or frame for interlaced video signals with the same picture rate.

This scanning line conversion offers high resolution only in the vertical direction for field video signals. Such scanning line conversion also offers high resolution for still pictures of frame video signals. Moving pictures of frame video signals are however degraded drastically due to blurs or double images because even and odd fields at different moments overlap each other.

Conversion of, for example, interlaced moving picture signals of 480 scanning lines (480i-format interlaced moving picture signals) to interlaced moving picture signals of 1080 scanning lines (1080i-format interlaced moving picture signals) are performed as follows:

The number of scanning lines of the 480i-format interlaced moving picture signals is converted into 1080.

Each of the even and odd fields with 240 scanning lines is converted by re-sampling (over-sampling) into another with 540 scanning lines for one field of 1080i-format.

The number of scanning lines is increased to 540, however, the resolution of each field lowers to about 120 cph (cycle per height) which is the resolution of field video signals.

Frames of 480 scanning lines are also converted into other frames with 1080 scanning lines. Such conversion of still picture frames offers resolution of about 180 cph, however, movement of the still picture frames degrades their picture quality.

Each converted frame or field of 720 pixels is converted into frame or filed of 1920 pixels by re-sampling (over-sampling) to have a 1080i-format interlaced moving picture signal. The number of pixels is increased with no change in resolution.

The video format conversion described so far offers a low resolution which corresponds to a field of the original moving picture signals (480i-format interlaced moving picture signals in the example) when the number of scanning lines is converted per field. Aliasing components of each interlaced field video signal remain unchanged after conversion.

Such conversion per frame offers high resolution for still pictures, however, movement of the still pictures degrades picture quality due to blurs or double images as discussed above.

Video format conversion per frame or field as described above degrades the quality of converted pictures compared to pictures before conversion.

SUMMARY OF THE INVENTION

A purpose of the present invention is to provide an apparatus and a method of video format conversion with high resolution but few aliasing components.

The present invention provides a moving picture format conversion apparatus for converting a first interlaced video signal of a first number of scanning lines into a second interlaced video signal of a second number of scanning lines, the first and second numbers being different from each other.

The apparatus includes a progressive video converter to convert the first interlaced video signal into a first progressive video signal of the first number of scanning lines by interpolating the first interlaced video signal with scanning lines which have been decimated from the first interlaced video signal; a scanning line converter to convert the first number of scanning lines of the first progressive video signal into the second number of scanning lines by re-sampling, to generate a second progressive video signal of the second number of scanning lines; and an interlaced video converter to convert the second progressive video signal into the second interlaced video signal by decimating the second number of scanning lines of the second progressive video signal.

There are alternatives for the scanning line converter for generating the second progressive video signal and the interlaced video converter for converting the second progressive video signal into the second interlaced video signal. The apparatus may include another scanning line converter to convert one of an even and odd frame of the first progressive video signal into an even field of the second interlaced video signal and the other of the even and odd frames of the first progressive video signal into an odd field of the second interlaced video signal; and an interlaced video composer to combine the even and odd fields to compose the second interlaced video signal.

Moreover, the present invention provides a moving picture format conversion method of converting a first interlaced video signal of a first number of scanning lines into a second interlaced video signal of a second number of scanning lines, the first and second numbers being different from each other.

The first interlaced video signal is converted into a first progressive video signal of the first number of scanning lines by interpolating the first interlaced video signal with scanning lines which have been decimated from the first interlaced video signal. The first number of scanning lines of the first progressive video signal is converted into the second number of scanning lines by re-sampling, to generate a second progressive video signal of the second number of scanning lines. And, the second progressive video signal is converted into the second interlaced video signal by decimating the second number of scanning lines of the second progressive video signal.

There are alternatives for conversion of the first number of scanning lines of the first progressive video signal for generation of the second progressive video signal; and conversion of the second progressive video signal into the second interlaced video signal. One of an even and odd frame of the first progressive video signal may be converted into an even field of the second interlaced video signal and the other of the even and odd frames of may be converted into an even field of the second interlaced video signal and the other of the even and odd frames of the first progressive video signal may be converted into an odd field of the second interlaced video signal. And, the even and odd fields are combined to compose the second interlaced video signal.

DETAILED DESCRIPTION OF PREFERRED EMBODIMENTS

Preferred embodiments according to the present invention will be described with reference to the attached drawings.

First Embodiment of Video Format Conversion

Figure 1:
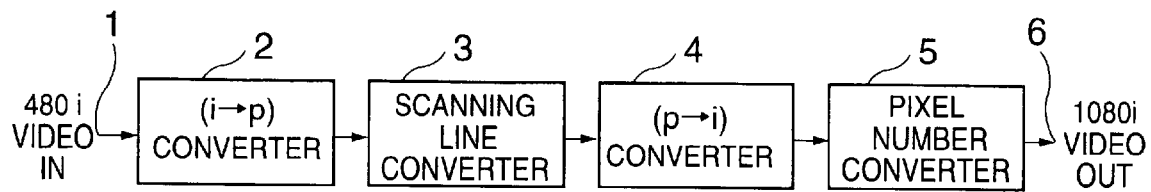
FIG. 1 shows a block diagram of the first preferred embodiment of a moving picture format conversion apparatus according to the present invention.

Shown in FIG. 1 is a block diagram of the first preferred embodiment of an apparatus for converting the format of moving picture signals.

Figure 2:
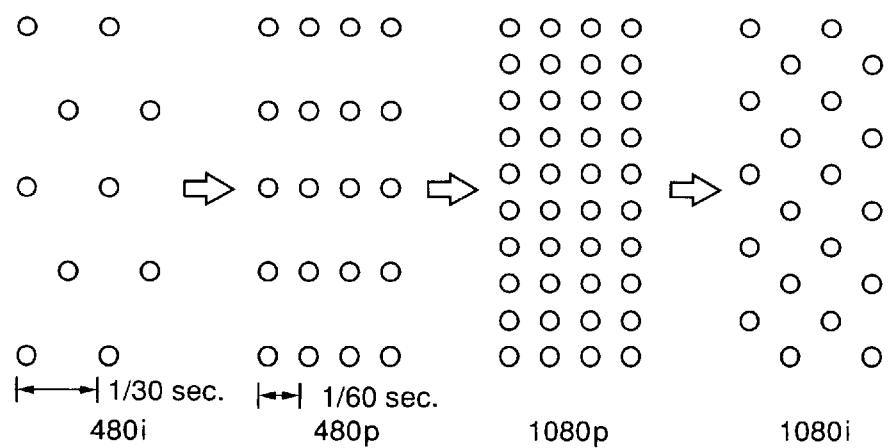
FIG. 2 illustrates change in the number of scanning lines during conversion according to the first embodiment.

A feature of the present invention is conversion in lines (indicated by the sign "O") with time elapsing in the horizontal direction through conversion. The vertical direction in FIG. 2 indicates the vertical direction of each picture. Conversion in the horizontal direction is performed by a well known method.

In FIG. 1, a moving picture signal of 480i-format (an interlaced signal of 480 scanning lines) is input to an (i to p) converter 2 shown in FIG. 1 via an input terminal 1. The 480i-format signal is converted into a moving picture signal of 480p-format (a progressive signal of 480 scanning lines) by the (i to p) converter 2.

This conversion is performed with motion-compensated adaptive interpolation to output progressive video signals of high picture quality. Such conversion of interlaced to progressive signals is disclosed in Japanese Patent No. 02832927 and the corresponding U.S. Pat. No. 5, 619, 273.

Figure 3:
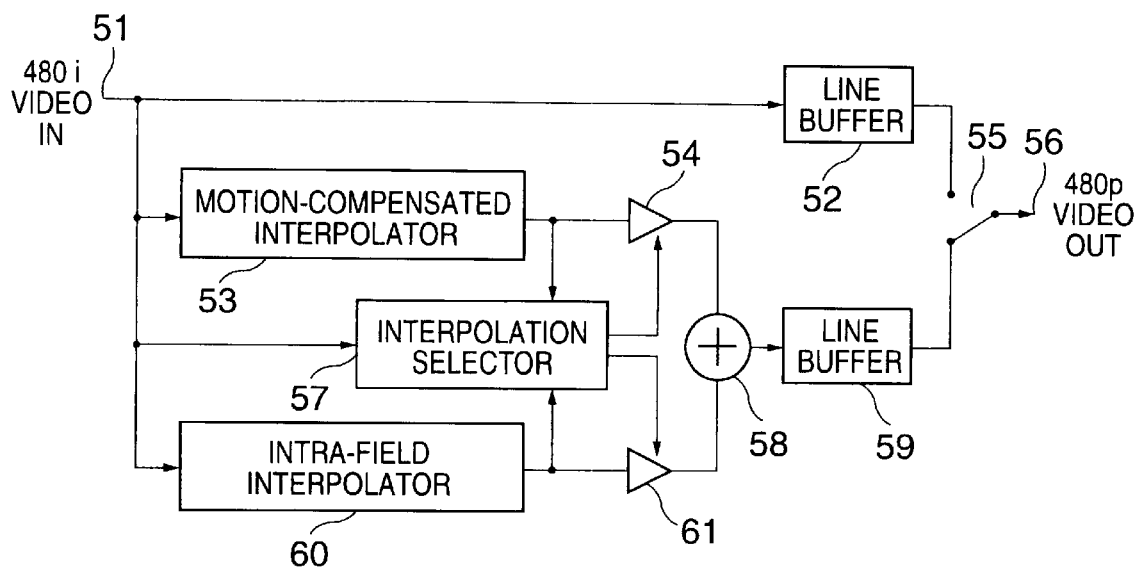
FIG. 3 shows a block diagram of a converter for interlaced to progressive signal conversion according to the present invention.

Shown in FIG. 3 is a block diagram of the (i to p) converter 2 according to the present invention.

The 480i-format video signal is input, via an input terminal 51, to a line buffer 52, a motion-compensated interpolator 53, an interpolation selector 57 and an intra-field interpolator 60.

The motion-compensated interpolator 53 estimates motion of the input video signal of small pixel blocks with reference to the anterior and posterior fields. These fields are moved per block according to the estimation for interpolation (inter-field interpolation).

The intra-field interpolator 60 generates scanning lines for interpolation by using the upper and lower scanning lines of the field that includes the scanning lines to be interpolated.

Picture portions of no movement or a normal movement undergo inter-field interpolation for resolution improvement and aliasing component removal. On the other hand, picture portions of a large movement or deformation undergo intra-field interpolation instead of inter-field interpolation for better interpolation.

The interpolation selector 57 selects either the inter-filed or intra-field interpolation in response to the input 480i-format video signal. The selector 57 then outputs coefficients 0 to 1 for interpolation signals input by the inter-filed interpolator 54 and the intra-field interpolator 60.

The interpolation signals output by the interpolators 53 and 60 are multiplied by the coefficients by multipliers 54 and 61, respectively. The multiplied interpolation signals are added to each other by an adder 58 and output to a line buffer 59 as scanning lines for interpolation.

The line buffer 59 and also another line buffer 52 store a video signal of one scanning line and switched by a scanning line selector 55 to alternately output one scanning line-video signal via an output terminal 56.

In detail, the video signal output via the terminal 56 is a progressive video signal of 480 scanning lines (480p-format video signal) composed of, one after the other, the scanning lines of the input 480i-format video signal and those for interpolation generated as described above.

The progressive signal generation markedly reduces aliasing components which have been included in the input 480i-format video signal due to decimation of interlaced signals. The reduction of aliasing components is achieved by conversion of the aliasing components into the signal components of original high frequency, such as, 120 cph or more, through the progressive signal generation.

Figures 4A, 4B:
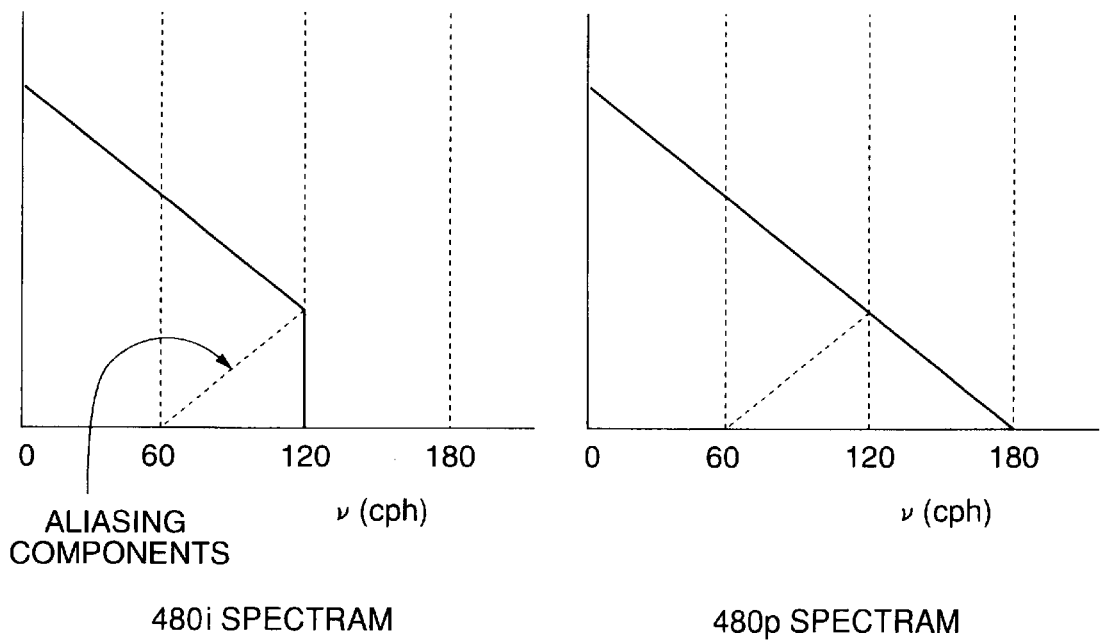
FIGS. 4A and 4B illustrate field video spectra of 480i- and 480p-format video signals, respectively.

Illustrated in FIGS. 4A and 4B are video signal spectra with respect to vertical frequencies ($\upsilon$) of field video signals before and after the progressive signal generation, respectively. As shown, the aliasing components indicated by the doted line in FIG. 4A are converted into the signal components of about 180 cph which is very similar to the original interlaced signal.

Returning to FIG. 1, the 480i-format signal which has been converted into the 480p-format signal by the (i to p) converter 2 is then supplied to a scanning line converter 3. The 480p-format signal is converted into a 1080p-format signal (progressive signal of 1080 scanning lines) with the same 180 cph resolution as that of the input 480i-format signal. This conversion is performed by well known re-sampling (over-sampling) at a conversion ratio 4:9.

The 1080p-format signal is supplied to a (p to i) converter 4. The converter 4 decimates the scanning lines of the 1080p-format signal to generate an interlaced signal of 1080 scanning lines (1080i-format signal). In detail, the conversion is performed by forming one field of the interlaced signal with either the even or odd scanning lines of an odd frame of the 1080p-format signal, and forming the other field of the interlaced signal with the even or odd scanning lines of an even frame of the 1080p-format signal. The even or odd scanning lines correspond to the scanning lines which have not been used for the former field.

This progressive to interlaced signal conversion does not require pre-filtering processing because of much low effective resolution of the input video signal.

The 1080i-format signal is supplied to a pixel number converter 5. The converter 5 converts the 1080i-format signal of 720 pixels in the horizontal direction into another 1080i-format signal of 1920 pixels in the horizontal direction with the same resolution. This conversion is performed by well known over-sampling at a conversion ratio 3:8. The converted 1080i-format signal of 1920 pixels is output via an output terminal 6.

The conversion of pixel number may be performed at any stage in FIG. 1. Such conversion at the last stage as described above is, however, the best because of increase in the number of pixels in the horizontal direction after pixel number conversion.

Second Embodiment of Video Format Conversion

The first embodiment converts the 480i-format moving picture signal into the 1080i-format moving picture signal as described above. On the other hand, The second embodiment converts a 1080i-format moving picture signal into a 480i-format moving picture signal.

Figure 5:
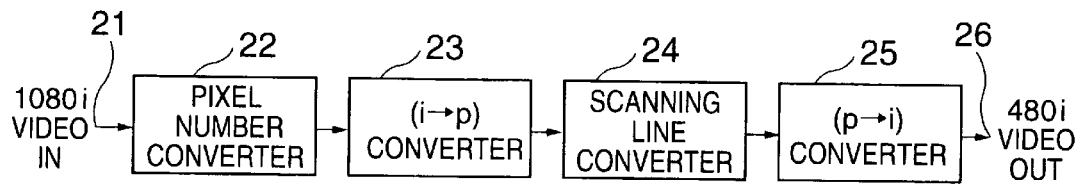
FIG. 5 shows a block diagram of the second preferred embodiment of a moving picture format conversion apparatus according to the present invention.

Shown in FIG. 5 is a block diagram of -the second preferred embodiment of an apparatus for converting the format of moving picture signals.

A 1080i-format video signal of 1920 pixels in the horizontal direction is input to a pixel converter 22 via an input terminal 21. The 1080i-format video signal is converted into another 1080i-format video signal of 720 pixels. This conversion is performed by sub-sampling at a conversion ratio 8:3 with decrease in resolution that corresponds to 720 pixels.

The converted 1080i-format video signal of 720 pixels is supplied to an (i to p) converter 23. The converter 23 converts the 1080i-format video signal into a progressive video signal of 1080 scanning lines (1080p-format signal).

The (i to p) converter 23 performs the same processing as that by the (i to p) converter 2 in FIG. 1 but at an amount of data different from that for input 1080 scanning lines.

The progressive signal generation markedly reduces aliasing components which have been included in the input 1080i-format video signal due to decimation of interlaced signals. The reduction of aliasing components is achieved by conversion of the aliasing components into the signal components of original high frequency, such as, 270 cph or more, through the progressive signal generation.

The converted 1080p-format signal is then supplied to a scanning line converter 24. The converter 24 converts the 1080p-format signal into another 1080p-format signal of 480 scanning lines (480p-format signal) by re-sampling (sub-sampling).

The scanning line converter 24 has the filtering characteristics which is different from that for the scanning line converter 3 (FIG. 1) for converting different number of scanning lines.

The filtering characteristics of the converter 24 exhibits pass-band frequencies about 30% lower than those for well known re-sampling filters, for generation of an interlaced signal by a (p to i) converter 25 which will be explained later. Pass-band frequencies the same as those for well known re-sampling filters will cause line flicker due to generation of too many aliasing components in scanning line decimation.

The 480p-format signal generated by the scanning line converter 24 is supplied to the (p to i) converter 25 and converted into an interlaced signal of 480 scanning lines. This conversion is performed by decimating the scanning lines of the 480p-format signal with no filtering processing which has been done by the converter 24. Band-pass filtering may be performed by a filter provided in between the converters 24 and 25. The re-sampling characteristics for the scanning line converter 24 may be a well known one in this case with no filtering characteristics as described above.

Third Embodiment of Video Format Conversion

Figure 6:
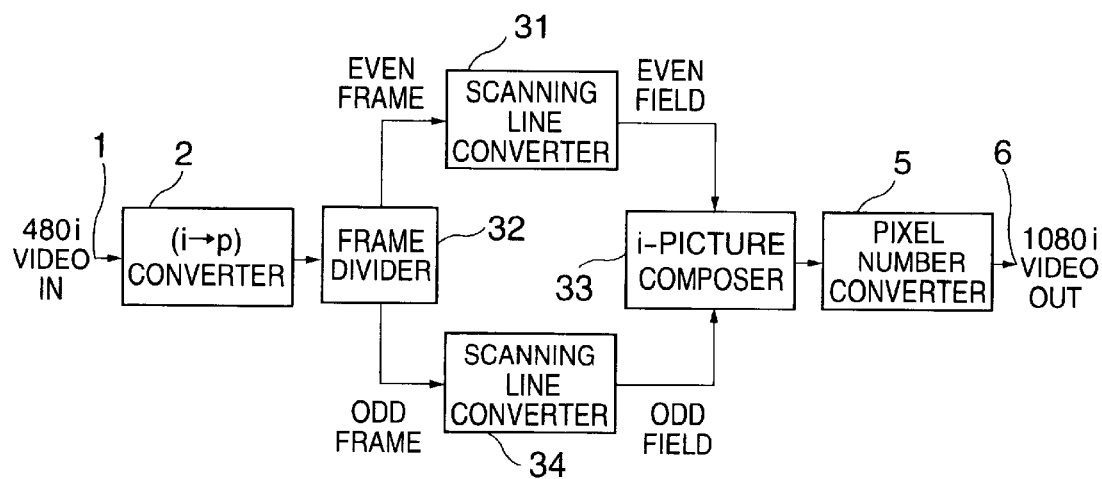
FIG. 6 shows a block diagram of the third preferred embodiment of a moving picture format conversion apparatus according to the present invention.

Shown in FIG. 6 is a block diagram of the third preferred embodiment of an apparatus for converting the format of moving Picture signals. Elements in the third embodiment that are the same as or analogous to elements in the first embodiment are referenced by the same reference numerals and will not be explained in detail.

The apparatus shown in FIG. 6 converts a 480i-format moving picture signal into a 1080i-format moving picture signal, like the first embodiment.

In FIG. 6, the 480p-format video signal generated by the (i to p) converter 2 like the first embodiment is supplied to a frame divider 32.

The 480p-format signal is divided into signals of even- and odd-frames. The even- and odd-frame signals are supplied to scanning line converters 31 and 34, respectively.

The converters 31 and 34 convert the even- and odd-frame signals to generate an even-field progressive signal of 540 scanning lines (540p-format signal) and an odd-filed progressive signal of 540 scanning lines (540p-format signal), respectively. The converters 31 and 34 perform conversion by the same well known re-sampling at a conversion ratio 8:9 but at different re-sampling phases (points).

This re-sampling difference is required for generation of the even- and odd-filed progressive signals which will be combined into an interlaced signal.

The re-sampling by the scanning line converters 31 and 34 is over-sampling with resolution of 180 cph the same for the input 480i-format signal.

Furthermore, the conversion by the scanning line converters 31 and 34 are performed as follow:

One pair of even and odd frames of the progressive signal generated by the (i to p) converter 2 are the same for the scanning line locations. On the other hand, such scanning line locations are different from each other for even and odd fields of an interlaced signal generated by an interlaced (i) picture composer 33 which will be explained later.

Therefore, the scanning line conversion is performed in such a way that even and odd frames of the progressive are converted onto the locations of the scanning lines of even and odd fields, respectively, of the interlaced signal or that even and odd frames of the progressive are converted onto the locations of the scanning lines of odd and even fields, respectively, of the interlaced signal.

The even- and odd-field signals having 540 scanning lines for each are supplied to the i-picture composer 33 and combined to an interlaced video signal of 1080 scanning lines (1080i-format signal).

The third embodiment is provided with the scanning line converters 31 and 33. One scanning line converter, however, may process both the even and odd frames which appear alternately by switching re-sampling phases (points). The provision of one converter requires simple processing of even or odd judgement for the frames and fields by the frame divider 32 and i-picture composer 33.

The 1080i-format signal generated by the i-picture composer 33 is supplied to the pixel number converter 5. The number of pixels of the 1080i-format signal is converted from 720 to 1920 with the same resolution as that of the input 480i-format signal. This pixel number conversion is over-sampling at a conversion ratio 3:8.

Fourth Embodiment of Video Format Conversion

Figure 7:
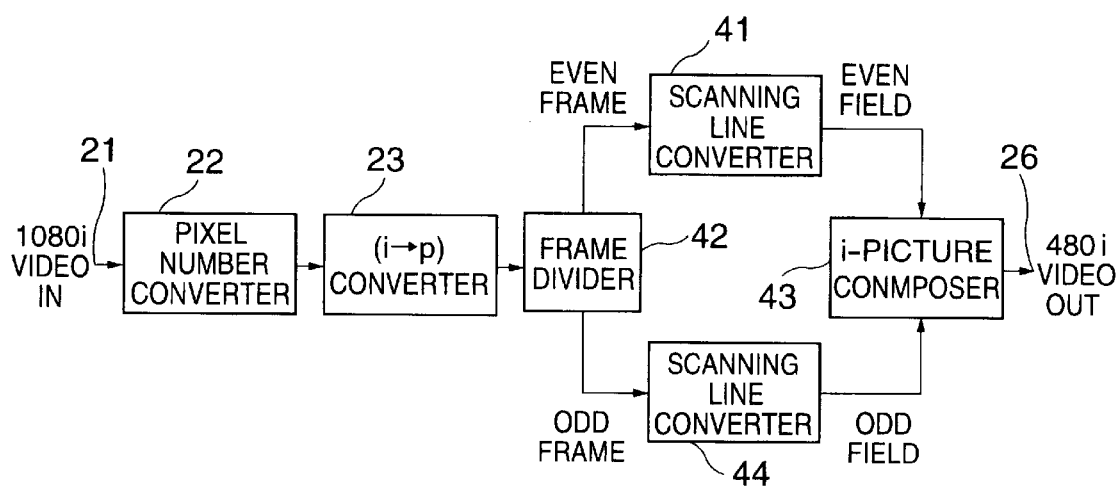
FIG. 7 shows a block diagram of the fourth preferred embodiment of a moving picture format conversion apparatus according to the present invention.

Shown in FIG. 7 is a block diagram of the fourth preferred embodiment of an apparatus for converting the format of moving Picture signals. Elements in the fourth embodiment that are the same as or analogous to elements in the second embodiment are referenced by the same reference numerals and will not be explained in detail.

The apparatus shown in FIG. 7 converts a 1080i-format moving picture signal into a 480i-format moving picture signal, like the second embodiment.

The processing after the (i to p) converter 23 will be described because the processing by the pixel converter 22 and the (i to p) converter 23 are the same as those in the second embodiment.

The 1080p-format video signal generated by the (i to p) converter 23 the same as described in the second embodiment is divided into even and odd frames by a frame divider 42.

The even- and odd-frame video signals having 1080 scanning lines for each are supplied to scanning line converters 41 and 44, respectively, and converted into even- and odd-field progressive signals of 240 scanning lines (240p-format video signals). The converters 41 and 44 exhibit pass-band frequencies of about 40% wider than well known scanning re-sampling to have residual aliasing components.

In detail, the converters 41 and 44 convert the even- and odd frames by re-sampling (sub-sampling) at different phases (points) at a conversion ratio 9:2 with residual aliasing components for 120 cph or lower which have originall been signal components of 180 cph or lower.

The even- and odd-field video signals having 240 scanning lines for each are supplied to an interlaced (i) picture composer 43. The composer 43 combines the even and odd 240 scanning lines to generate an interlaced video signal of 480 scanning lines (480i-format video signal).

According to the present invention, a first interlaced moving picture signal is converted into a second interlaced moving picture signal of scanning lines the number of which is different from that of the first signal via conversion of the first signal into a first progressive signal with re-sampling.

The conversion of the first interlaced signal into the first progressive signal removes aliasing components included in the first interlaced signal to generate the first progressive signal of high resolution. The first progressive signal is converted by re-sampling into a second progressive signal of the same high resolution but a different number of scanning lines.

The scanning lines of the second progressive signal are decimated to generate the second interlaced signal with high resolution and less distortion.

Pass-band frequencies for the re-sampling can be adjusted for restricting aliasing components which will be included in the second interlaced signal for no degradation of picture quality.

What is claimed is:

1. A moving picture format conversion apparatus for converting a first interlaced video signal of a first number of scanning lines into a second interlaced video signal of a second number of scanning lines, the first and second numbers being different from each other, the apparatus comprising:

a progressive video converter to convert the first interlaced video signal into a first progressive video signal by interpolating the first interlaced video signal with scanning lines which have been decimated from the first interlaced video signal, the first progressive video signal having the first number of scanning lines identical to the first number of scanning lines for the first interlaced video signal at a frame rate identical to a field rate for the first interlaced video signal;

a scanning line converter to convert the first number of scanning lines of the first progressive video signal into the second number of scanning lines by re-sampling, to generate a second progressive video signal of the second number of scanning lines; and an interlaced video converter to convert the second progressive video signal into the second interlaced video signal by decimating the second number of scanning lines of the second progressive video signal, the second interlaced video signal having the second number of scanning lines identical to the second number of scanning lines for the second progressive video signal at a field rate identical to a frame rate for the second progressive video signal.

2. A moving picture format conversion apparatus for converting a first interlaced video signal of a first number of scanning lines into a second interlaced video signal of a second number of scanning lines, the first and second numbers being different from each other, the apparatus comprising:

a progressive video converter to convert the first interlaced video signal into a first progressive video signal by interpolating the first interlaced video signal with scanning lines which have been decimated from the first interlaced video signal, the first progressive video signal having the first number of scanning lines identical to the first number of scanning lines for the first interlaced video signal at a frame rate identical to a field rate for the first interlaced video signal;

a scanning line converter to convert one of an even and odd frame of the first progressive video signal into an even field of the second interlaced video signal and the other of the even and odd frames of the first progressive video signal into an odd field of the second interlaced video signal; and an interlaced video composer to combine the even and odd fields to compose the second interlaced video signal having the second number of scanning lines different from the first number of scanning lines for the first progressive video signal at field rate identical to a frame rate for the first progressive video signal.

3. The moving picture format conversion apparatus according to claim 1, wherein the progressive video converter comprises:

a first interpolator to interpolate the first interlaced video signal between pictures of the first interlaced video signal to generate a first interpolating signal;

a second interpolator to interpolate the first interlaced video signal by scanning line interpolation per picture to generate a second interpolating signal;

a selector to select either the first or the second interpolating signal according to movement of the first interlaced video signal; and a composer to selectively output the first interlaced video signal and the selected interpolating signal per scanning line to compose the first progressive signal.

4. A moving picture format conversion method of converting a first interlaced video signal of a first number of scanning lines into a second interlaced video signal of a second number of scanning lines, the first and second numbers being different from each other, the method comprising the steps of:

converting the first interlaced video signal into a first progressive video signal of the first number of scanning lines by interpolating the first interlaced video signal with scanning lines which have been decimated from the first interlaced video signal, the first progressive video signal having the first number of scanning lines identical to the first number of scanning lines for the first interlaced video signal at a frame rate identical to a field rate for the first interlaced video signal;

converting the first number of scanning lines of the first progressive video signal into the second number of scanning lines by re-sampling, to generate a second progressive video signal of the second number of scanning lines; and converting the second progressive video signal into the second interlaced video signal by decimating the second number of scanning lines of the second progressive video signal, the second interlaced video signal having the second number of scanning lines identical to the second number of scanning lines for the second progressive video signal at a field rate identical to a frame rate for the second progressive video signal.

5. A moving picture format conversion method of converting a first interlaced video signal of a first number of scanning lines into a second interlaced video signal of a second number of scanning lines, the first and second numbers being different from each other, the method comprising the steps of:

converting the first interlaced video signal into a first progressive video signal of the first number of scanning lines by interpolating the first interlaced video signal with scanning lines which have been decimated from the first interlaced video signal, the first progressive video signal having the first number of scanning lines identical to the first number of scanning lines for the first interlaced video signal at a frame rate identical to a field rate for the first interlaced video;

converting one of an even and odd frame of the first progressive video signal into an even field of the second interlaced video signal and the other of the even and odd frames of the first progressive video signal into an odd field of the second interlaced video signal; and combining the even and odd fields to compose the second interlaced video signal having the second number of scanning lines different from the first number of scanning lines for the first progressive video signal at field rate identical to a frame rate for the first progressive video signal.

6. The moving picture format conversion method according to claim 4, wherein the step of converting the first interlaced video signal includes the steps of:

interpolating the first interlaced video signal between pictures of the first interlaced video signal to generate a first interpolating signal;

interpolating the first interlaced video signal by scanning line interpolation per picture to generate a second interpolating signal;

selecting either of the first or the second interpolating signal according to movement of the first interlaced video signal; and selectively outputting the first interlaced video signal and the selected interpolating signal per scanning line to compose the first progressive signal.

* * * * *